United States Patent [19]
Goolsby

[11] 3,710,152
[45] Jan. 9, 1973

[54] CHROMIUM ELECTRODES FOR MAGNETOHYDRODYNAMIC GENERATORS

[75] Inventor: Patrick F. Goolsby, Florence, Ala.

[73] Assignee: Reynolds Metals Company, Richmond, Va.

[22] Filed: June 26, 1970

[21] Appl. No.: 50,334

[52] U.S. Cl. .................................................310/11
[51] Int. Cl. .............................................H02k 4/02
[58] Field of Search ................310/11; 313/310, 311

[56] References Cited

UNITED STATES PATENTS

| | | | |
|---|---|---|---|
| 3,349,260 | 10/1967 | Louis | 310/11 |
| 3,423,611 | 1/1969 | D'Albis et al. | 310/11 |
| 3,479,538 | 11/1969 | Yerouchalmi | 310/11 |
| 3,531,421 | 9/1970 | Foex et al. | 310/11 X |

*Primary Examiner*—D. X. Sliney
*Attorney*—Glenn, Palmer, Lyne, Gibbs and Thompson

[57] ABSTRACT

A thermionic-emitting chromium electrode for magnetohydrodynamic generators possessing excellent electrical stability, oxidation resistance, and resistance to basic slags is set forth. In a preferred embodiment the chromium electrode contains 0.5 to 25 percent of thorium oxide or similar dopants.

10 Claims, No Drawings

CHROMIUM ELECTRODES FOR MAGNETOHYDRODYNAMIC GENERATORS

BACKGROUND OF THE INVENTION

1. Field of the Invention

This invention relates to chromium compositions and particularly relates to chromium-based electrodes which are good thermionic emitters at elevated temperatures. It especially relates to chromium electrodes which are suitable for use in magnetohydrodynamic (MHD) generators.

2. Description of the Prior Art

Oxidation-resistant materials for use at high temperatures comprise alloys, metal-ceramic composites or cermets, and ceramics. Cermets are properly described as dispersion-hardened bodies having a metallic or matrix phase in which a metal oxide phase is dispersed, the impregnant being more than 30 percent by volume of the mixture. Typical sintered chromium-based cermets have excellent oxidation resistance, thermo-shock resistance, and low creep susceptibility, for use as turbine blades, rocket engine parts, extrusion dies, and the like.

Another high temperature composition may be described as metal alloys or substantially pure refractory metals which are impregnated with a relatively low amount of metal oxide in a dispersed phase. This dispersant is sometimes spoken of as a dopant which may be specifically selected for thermionic-emitting properties. Heavy-metal oxides, such as zirconia, thoria, and hafnia, are good thermionic-emission dopants.

Particularly severe requirements exist for electrodes in an MHD system where temperatures of 2,000–5,000≡χ K. may exist in a rapidly moving oxidizing gas stream which also contains basic and highly reactive solid materials in particulate form. Under such conditions, many metals and oxides sublimate or ablate at an intolerable rate, and others are eroded by oxidation or by reaction with the basic compounds. MDH electrodes obviously must have reasonably good electrical conductivity, and MHD cathodes must also be thermionic emitters.

Despite intense research and inventive activity, practical development of MHD convertors for generating electrical energy has been retarded by unduly brief electrode lifetimes. A simpler electrode composition having sufficient strength, chemical resistance, erosive resistance, and low vapor pressure to permit a simple electrode design to be used without cladding by noble metals would be widely useful.

SUMMARY OF THE INVENTION

This invention is directed towards an MHD process using a chromium electrode, preferably an electrode formed of a composition consisting essentially of an oxide-doped chromium or chromium alloy, the composition having good thermionic emissivity at temperatures below 2,000° K. and good electrical conductivity and stability resistance to oxidation, abrasion, and attack by basic materials. The invention further provides a process for manufacturing these electrodes.

DESCRIPTION OF THE INVENTION

In accordance with this invention it has been discovered that chromium has sufficient electrical conductivity for general electrode utility, is sufficiently basic to resist erosion from basic slags in the severe MHD environment, sufficiently inhibits anticipated sublimative characteristics at MHD temperatures by formation of a barrier-type oxide shield, and in operative use possesses such unexpectedly superior electrical stability as to be highly useful as an electrode in an MHD process. In further development of this invention, a principle has been discovered that enables the electrodes of this invention to be particularly useful as cathodes and consists of preparing a novel composition by choosing a metal, metal-compound, or alloy which has electrical conductivity and a sufficiently high melting point, as the base electrode material, and adding thereto another material as a dopant which is capable of lowering the total thermionic work function of the composition relative to the base electrode material, thus allowing the electrode to be a good thermionic emitter at elevated temperatures. The metal, metal-compound, or alloy functioning as the base electrode material must have the following additional properties:

1. stability in oxidizing and reducing atmospheres,
2. reasonable abrasive resistance,
3. ability to withstand attack by basic slags or alkaline compounds, and
4. reasonably low vapor pressure.

The material to be added to the base electrode material as a dopant must have the following additional characteristics:

1. no detrimental effect on the melting point or vapor pressure of the base material,
2. ability to withstand oxidizing and reducing atmospheres,
3. ability to withstand attack by basic vapor slags or alkaline compounds,
4. no disruptive effect upon the metallic nature of the base electrode material, and
5. ability to increase abrasive resistance of the base electrode material.

All of the metallic materials suitable for use as the base metal are subject to oxidation at high temperatures. These metals span oxidation behavior from among the best to the worst known for metals. Alloying is the most desirable way to overcome poor oxidation resistance, but if the alloying metal or the base metal oxide melts at too low a temperature, this solution of the oxidation problem is not usable.

Chromium, as a refractory metal having good strength at elevated temperatures, has a relatively low oxidation rate at temperatures below its melting point, such as at 1,000° C. Its oxide is also tightly bound to the metal. Although chromium reacts preferentially with nitrogen and becomes embrittled, this difficulty can be obviated by suitable structural design. Investigation indicated that chromium is basic and therefore not likely to be attacked by alkalis or basic slags in a hot gas. However, chromium is known to have a very high vapor pressure and should evaporate and ablate badly at high temperatures, as indicated by the following vapor pressure-temperature relationship for chromium from page 105 of "Metallurgy of Chromium and Its Alloys," by Marvin J. Udy, American Chemical Society Monograph Series, 1956:

| Temperature, °C. | Pressure, atm |
| --- | --- |
| 972 | $10^{-9}$ |
| 1053 | $10^{-8}$ |
| 1145 | $10^{-7}$ |
| 1249 | $10^{-6}$ |
| 1372 | $10^{-5}$ |
| 1516 | $10^{-4}$ |
| 1594 | $10^{-3}$ (solid) |
| 1813 | $10^{-2}$ (liquid) |
| 2097 | $10^{-1}$ |
| 2234 | $2.5 \times 10^{-1}$ |
| 2351 | $5 \times 10^{-1}$ |
| 2482 | 1 |

The chromium vapor pressure at about 1,600° C., for instance, is equivalent to the vapor pressure of ice at −20° C. The marked sublimation of ice or snow that typically occurs, particularly in high winds, is common knowledge.

Example 1

A chromium sample was fabricated to a typical MHD electrode configuration and exposed to temperatures up to 1,600° C. in an argon atmosphere for about 15 hours. The weight loss expected from vaporization did not occur. On examining the sample, it was found that the surface was coated with a thin layer of chromic oxide. Apparently this coating suppressed the vapor pressure of the metal. This surprising result meant that chromium could be an ideal base electrode material.

Because MHD gases are usually oxidizing to some degree, the choice of dopant materials was virtually limited to oxides. Oxides having suitability for increasing the abrasive resistance of the chromium and decreasing the thermionic work function include $BaO$, $CaO$, $CeO_2$, $HfO_2$, $La_2O_3$, $NiO$, $SrO$, $ThO_2$, $TiO_2$ and $ZrO_2$, and mixtures thereof.

Example 2

Thorium oxide, $ThO_2$, was chosen from the available oxides as the most attractive dopant material. A mixture of chromium powder and four percent (by weight) of thoria was placed in toluene which had about three percent oleic acid added thereto. In this mixture, the toluene acted as a liquid carrier while the oleic acid acted as a surface wetter. After thorough mixing, the solution was vacuum dried. The resulting powder was pressed into buttons at 40,000 p.s.i. These buttons were sintered at 1,100° C. for 7-½ hours. The sintered buttons were tested in an MHD generator for 7 hours. The electrical data, weight loss data, and appearance of the buttons indicated that this MHD electrode had successfully withstood the high temperature, oxidizing conditions, basicity, and erosive conditions of the MHD generator environment.

EXAMPLE 3

The same procedure was used in forming buttons containing eight percent thoria. Similar testing in an MHD generator for 7 hours gave equally good results as to electrical generation and stability while withstanding the harsh environment therein.

In general, it has been ascertained that chromium and various chromium alloys function effectively as MHD electrodes. Chromium-nickel, chromium-titanium, chromium-zirconium, and the like alloys, in which chromium is at least 85 percent of the alloy by weight, are useful, either alone or as oxide-doped compositions. It has further been found that thermionic-emitting chromium electrodes for MHD generators operate successfully at dopant levels of 0.5 – 25 percent and are particularly successful at dopant levels of 2–10 percent.

Experience in making these electrodes according to the process of this invention has shown that a number of carrier liquids are suitable in addition to toluene, such as benzene, xylene, ethylbenzene, and the like. A variety of surface wetters have also been tested. The results have shown that some surface wetters which are successful in combination with one dopant may be unsuccessful with another. Oleic acid, for example, was not satisfactory in combination with calcium oxide as the dopant, but oxalic acid was entirely successful. In most mixing combinations, moreover, oxalic acid was found to be much superior to oleic acid and easier to work with as a surface wetter, especially in the drying process.

Protracted testing of several oxide-doped chromium electrodes, which had been manufactured according to the process and criteria described hereinbefore, in a magnetohydrodynamic generator under high flux loads and operating temperatures has also established that these electrodes do not suffer from any long-term electrical degradation, i.e., the electrode voltage drop does not increase with MHD operation time. This finding is important because it greatly enhances the practical operating utility of MHD systems for generating large quantities of electrical energy.

What is claimed is:

1. The method of operating a magnetohydrodynamic generator for transforming thermal energy into electrical energy in which at least one electrode consists essentially of a composition selected from the group consisting of: chromium, a chromium alloy, chromium doped with a metal oxide, and a chromium alloy doped with a metal oxide.

2. The method of claim 1 in which said chromium alloy is an alloy of at least 85 percent chromium and at least one refractory metal selected from the group consisting of: columbium, molybdenum, tantalum, titanium, tungsten, and zirconium.

3. The method of claim 1 in which said metal oxide is capable of lowering the total thermionic work function of said composition relative to said chromium or chromium alloy.

4. This method of claim 3 in which said metal oxide is selected from the group consisting of: barium oxide, calcium oxide, cerium oxide, hafnium oxide, lanthanum oxide, nickel oxide, strontium oxide, thorium oxide, titanium oxide, and zirconium oxide.

5. The method of claim 4 in which said metal oxide is from about 0.5 to about 25 percent by weight of said composition.

6. The method of claim 5 in which said magnetohydrodynamic generator is operated at temperatures of 2,000°–5,000° K.

7. The method of claim 6 in which the electrodes consist essentially of chromium and thoria.

8. A refractory metal composition for MHD electrodes having thermionic emissivity and electrical conductivity which consists essentially of chromium as the base electrode material and from about 0.5 to about 25 weight percent of a metal oxide dopant, possessing thermionic emissivity and capability of lowering the total thermionic work function of said composition relative to said chromium, which is selected from the group consisting of barium oxide, calcium oxide, cerium oxide, hafnium oxide, lanthanum oxide, nickel oxide, strontium oxide, thorium oxide, titanium oxide, and zirconium oxide.

9. The method of preparing an MHD electrode having a relatively low thermionic work function which comprises:
   a. forming a metallic composition by thoroughly mixing powered chromium with a metal oxide at about 0.5 to about 25 weight percent of said mixture, said metal oxide possessing thermionic emissivity and being capable of lowering the total thermionic work function of said metallic composition relative to said chromium, in a carrier liquid having about 3 weight percent of a surface wetter therein,
   b. forming a dried powder by vacuum drying said mixture,
   c. pressing said dried powder into buttons having the configuration of an MHD electrode at about 40,000 psi, and
   d. sintering said buttons at about 1,100° C. for about 7-½ hours.

10. The method of using the buttons prepared according to the method of claim 9 as a cathode in a magnetohydrodynamic generator without long-term electrical degradation, sublimative or ablative erosion, or attack by basic slags.

* * * * *